United States Patent [19]

Lindroos

[11] 4,226,195
[45] Oct. 7, 1980

[54] WATER HEATING STOVE

[76] Inventor: Martii K. Lindroos, Birch Hill Rd., R. 2 Sudbury, Ontario, Canada, P3E L9M

[21] Appl. No.: 972,224

[22] Filed: Dec. 22, 1978

[51] Int. Cl.³ .............................................. F23G 5/00
[52] U.S. Cl. ................................. 110/234; 110/188; 110/309; 122/33
[58] Field of Search ............... 122/2, 33, 155 R, 156; 110/188, 309, 234; 236/45; 62/289; 126/361

[56] References Cited

U.S. PATENT DOCUMENTS

| 344,559 | 6/1886 | Barker | 236/10 |
| 1,988,503 | 1/1935 | McCathron | 122/33 X |
| 2,406,673 | 8/1946 | Drummond | 122/33 |
| 2,627,252 | 2/1953 | Mohn | 122/33 |
| 4,088,113 | 5/1978 | McIntire et al. | 236/45 X |

*Primary Examiner*—Edward G. Favors
*Attorney, Agent, or Firm*—Hirons, Rogers & Scott

[57] ABSTRACT

A water heating stove, comprises a fire box substantially surrounded by a water jacket through which water to be heated circulates. The fire box is completely closed by sealing, loading and clean out doors, to provide that the only access for combustion air is a special aperture below the fire, controlled by a thermostatically operated damper. The fire box bottom wall is inclined to allow drainage of water condensates without losing combustion air flow control, via a water trap. The stove includes a heat transfer coil through which water is circulated to supply hot water.

8 Claims, 3 Drawing Figures

WATER HEATING STOVE

FIELD OF THE INVENTION

This invention relates to water heating stoves, particularly water heating stoves of the type suitable for installation in a domestic residence or small apartment building, for the supply of hot water to a hot water central heating system.

BACKGROUND OF THE INVENTION

Hot water heating systems are conventionally provided in domestic residences, public buildings, schools, small apartment buildings and the like, with a series of pipes and radiators in each room through which hot water is circulated. The water is heated by means of a solid fuel fired boiler located in the basement of the building, the water being circulated continuously through the system and through a heat exchanger associated with the boiler. With the ever increasing costs of heating fuels, it is desirable that any such boiler be used to its maximum efficiency in heat transfer, and that it be capable of burning a wide variety of different fuels, including refuse, for this purpose. It is also desirable that full control be exercised over the temperature of the water issuing from the heat exchanger associated with the boiler, to avoid overheating and wastes of fuel capacity.

BRIEF DESCRIPTION OF THE PRIOR ART

The prior art contains many references to water heating stoves, furnaces, boilers, etc. equipped with heat exchangers for heating water, and adapted to a variety of different purposes. Many different features have been proposed in the past in an attempt to maximize the heat output of such a furnace, and enhance its efficiency of heat transfer and economize on fuel consumption. For example, it is known to include tubular grates in such furnaces through which water may be circulated. U.S. Pat. No. 1,975,601 Graafen and U.S. Pat. No. 2,005,544 Graafen are examples of such prior art references. In U.S. Pat. No. 1,081,337 Sims there is shown a form of boiler having inclined hollow water circulating grate tubes, designed to enhance water circulation by convection activity.

U.S. Pat. No. 1,243,901 Unger shows a water jacketed stove having water filled tubular grate bars, to support the fire. Hot water is circulated through the grate bars for heating purposes. The grate bars comprise a plurality of rectangular section tubes, connected to opposite sides of a circular water jacket which surrounds the fire.

U.S. Pat. No. 1,865,958 shows a water jacketed stove having a fire grate consisting of hollow inclined tubes through which water is circulated from one side of the water jacket. This apparatus is said to be useful either as a boiler or as a hot water heater.

U.S. Pat. No. 1,988,503 McCathron shows a water heating coil in a water jacketed boiler, the coil being immersed in the heated water which is heated by the furnace. The heating coil is immersed in a water bath of the heated water above the fire box. U.S. Pat. No. 2,592,980 Vanwert shows a basically similar arrangement.

It is also known from the prior art to provide water cooled doors for furnaces. For example, U.S. re-issue Patent 17864 Williams such an arrangement for an open hearth furnace for use in steel making processes. U.S. Pat. No. 3,252,448 Braun and U.S. Pat. No. 3,196,845 also show water cooled doors for various types of furnaces, and various applications.

However, none of the prior art references show a domestic furnace which is both highly efficient in fuel consumption, useful for a variety of different fuels, provide high heat transfer capacity to water circulating in contact therewith, and at the same time are readily controllable as to the temperature of the water being heated by the furnace.

SUMMARY OF THE INVENTION

It is an object of the present invention to provide a novel water heating furnace, especially for use in central heating systems of domestic residences, small apartment buildings and public buildings.

It is a further object of the present invention to provide such a form of furnace which provides high heat transfer capability to water circulating therewith, and at the same time provides full control over the ingress of combustion air to the furnace, for efficient operation and control over the temperature of water issuing from the furnace.

In fulfillment of these objectives, the present invention provides a water jacketed furnace, provided with a water jacket provided around its side and rear walls. The front wall is equipped with a fuel loading aperture, the door of which is also part of the water jacket, and communicates with the side portions of the water jacket. Below the level of the fire therein, there is provided a damper controlled combustion air inlet, which, in operation, provides the sole means of supply of combustion air. The damper is thermostatically controlled, so as to provide accurate control over the amount of air entering the furnace, thereby increasing the efficiency of fuel consumption. So that the furnace may operate by burning of a wide variety of fuels including refuse, a drain outlet from the interior of the fire box is provided, to remove condensed liquids therefrom. This drain outlet protrudes from the bottom of the furnace, and terminates in an exterior water trap, so that its presence does not interfere with the control on the supply of combustion air to the interior of the furnace.

As a result of this arrangement, a water heating furnace is provided which is efficient in operation, and readily controllable to provide heating water of the desired temperature. A wide variety of fuels can be used, and cleaning of the interior of the furnace, by draining of condensate therefrom, proceeds automatically without destroying the control over the furnace operation.

Thus according to the present invention, there is provided a water heating stove for supply of hot water to circulating hot water heating systems, comprising:

a fire box having a fire supporting grate therein, a fuel loading aperture in a front wall thereof and a flue outlet for exit of combustion gases therefrom;

a water jacket lining the rear and side upright walls of said fire box;

inlet means and outlet means for circulating water into and out of said water jacket;

a fuel loading door adapted to close the fuel loading aperture to prevent ingress of combustion air through said aperture;

a combustion air inlet in the fire box, and disposed at a level below the fuel loading door, said combustion air inlet being equipped with a damper means adapted to adjust air flow therethrough, said damper control air inlet comprising the sole substantial inlet for combustion air to the fire box when the fuel loading door is closed;

a bottom wall of said fire box, below the fire supporting grate, shaped to provide a lowermost zone for collection therein of liquid residues and condensates from the fire box;

an outlet conduit having an inner end communicating with said lowermost zone inside the fire box and an outer end disposed exterially of the fire box and at a level below that of the inner end;

a water trap into which the outer end of said outlet conduit protrudes, said outer end being disposed below the water level in said water trap, substantially to prevent access of air to the fire box through said outlet conduit.

BRIEF REFERENCE TO THE DRAWINGS

DESCRIPTION OF THE PREFERRED EMBODIMENTS

Figure 1:
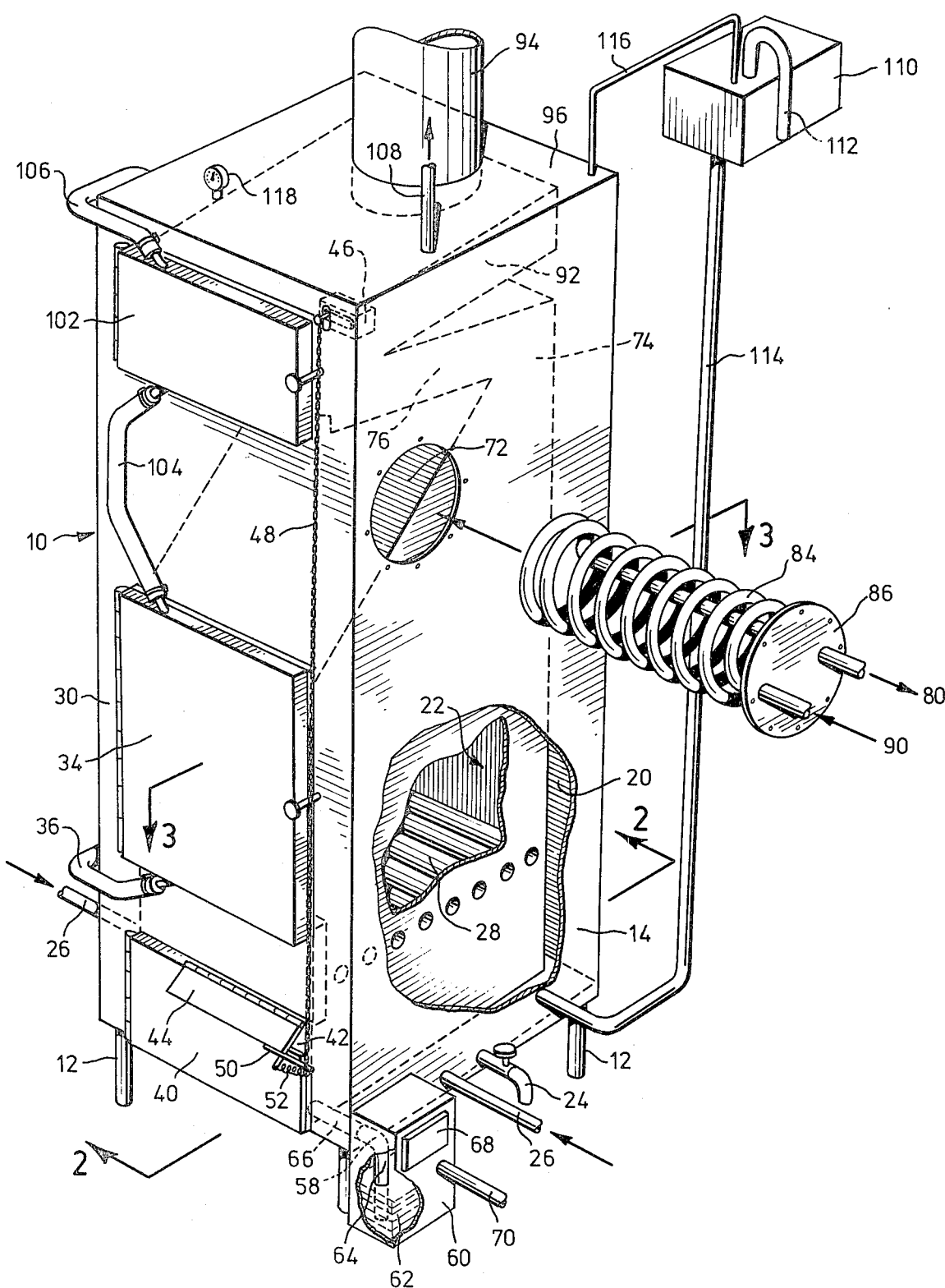
FIG. 1 is an exploded perspective view, with parts cut away, of the preferred embodiment of the invention.

Preferably, the damper means for the combustion air inlet of the stove according to the invention is thermostatically controlled, from a thermostat sensing temperature in water circulating out of the water jacket following heat exchange with the fire box. The water jackets herein referred to are primarily in direct communication with the outer walls of the fire box, for direct heat transfer therethrough.

It is also preferred to arrange for the upper wall of the fire box to comprise an inclined surface sloping upwardly from the front wall towards the rear wall of the fire box, to define flue outlet adjacent the rear wall thereof, at the top of the fire box. The flue outlet may communicate with a forwardly extending first flue passageway section, the lower boundary wall of which section may be integral with the top wall of the fire box, and to define therebetween, along with the upper portion of the front wall, a wedge-shaped segment, filled with water since it is in communication with the water jacket at either side wall of the furnace. Due to its location, such wedge-shaped segment is subject to intense heating from the fire within the fire box. It is preferred to include in said wedge-shaped section a heating coil through which additional water may be circulated, for feeding to the bathrooms and sinks of the building in which the furnace is installed, as a source of supply of hot water thereto.

Preferably also, the fire supporting grate within the fire box comprises a series of parallel tubular members extending between the side upright walls, and communicating with the water jackets therein, the tubular members of the grate having a slight upward inclination. By this means, they provide for water circulation through the grate, the upward inclination thereof enhancing the water flow due to convection effects. Such an arrangement also contributes to the heat transfer efficiency from the fire box, thereby more efficiently using the fuel consumption, and also helps to keep the grate cool and prolong the life of the tubes therein.

DETAILED DESCRIPTION OF THE SPECIFIC PREFERRED EMBODIMENT

Referring to the drawings, in which like reference numerals indicate like parts, the stove 10 according to the invention comprises an upright, generally rectangular structure resting on short bottom legs 12. The vertical side walls 14, 16 and the rear wall 18 are double thickness to comprise a water jacket 20 extending continuously around the three vertical sides and lining the fire box 22 therein. A drain tap 24 is provided in the bottom of the jacket 20 so that the jacket can be drained and emptied when required. Inlet pipes 26 are also provided in the bottom of the jacket, for inlet of circulating water to be heated by the stove 10.

Figure 2:
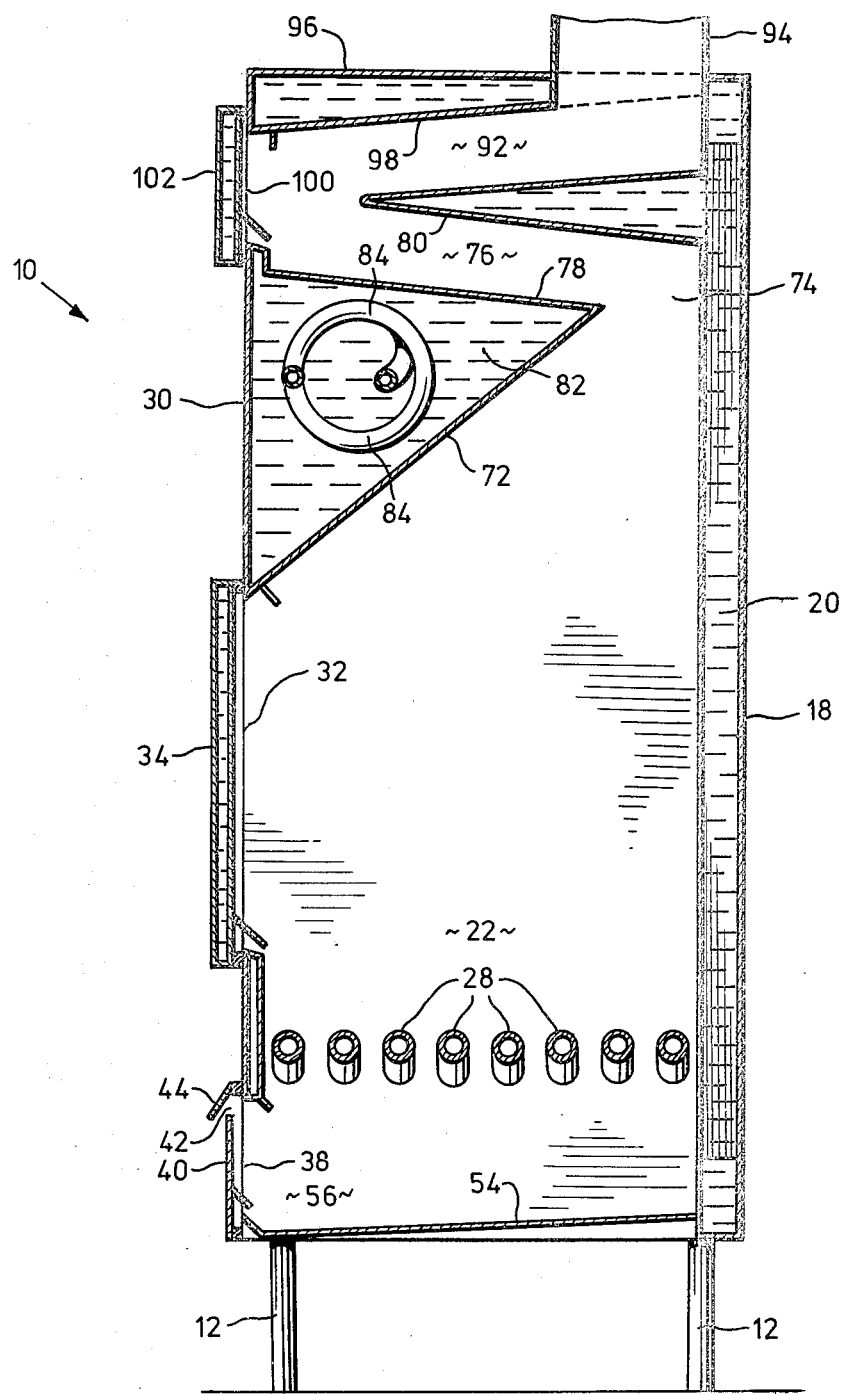
FIG. 2 is a sectional view along the line 2—2 of FIG. 1.
Figure 3:
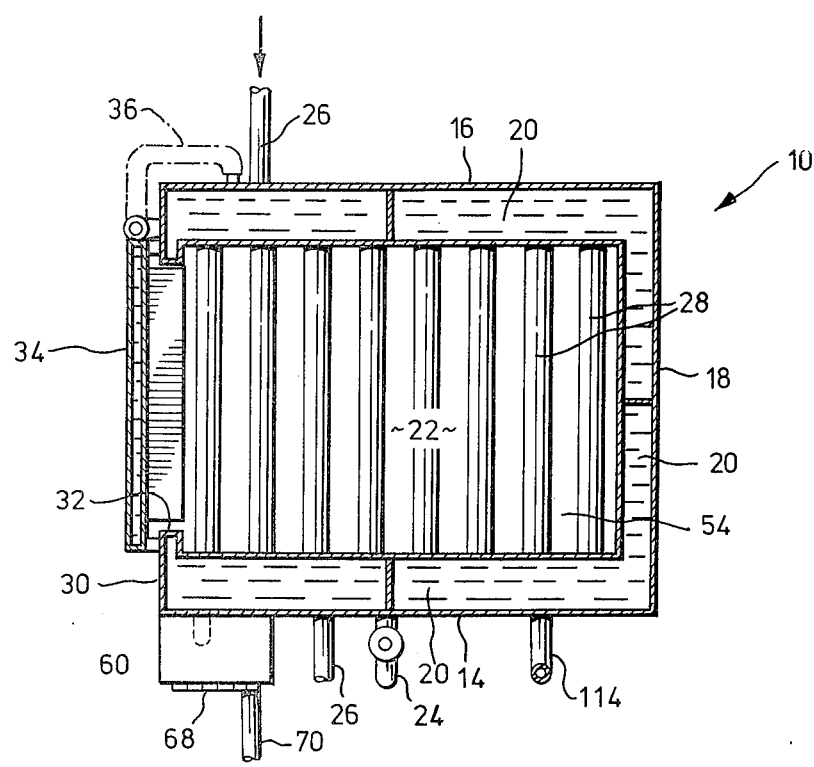
FIG. 3 is a sectional view along the line 3—3 of FIG. 1.

A series of tubular, generally parallel bars 28 are provided to act as a grate in the fire box 22. The grate bars 28 are hollow, tubular, and communicate with the water jacket 20 at both sides 14, 16 to allow circulation of water therethrough and enhance the heating thereof. As best seen in FIG. 2, the grate bars 28 are inclined upwardly, to a small extent, to ehance the circulation of heated water by convection.

The front wall 30 of the fire box 22 includes a loading aperture 32 with a hinged fuel loading door 34 hingedly mounted to close the aperture 32. When the loading door 34 is open, easy access is provided for loading fuel onto the grate bars 28 which are located just below the aperture 32. When the loading door 34 is secured in its closed position, it effectively prevents ingress of air into the fire box 22 therethrough. The loading door 34 is hollow with a watertight interior, and water is circulated therethrough by means of a flexible hose 36 communicating with the door interior and the water jacket 20. Below the loading door 34, the front wall 30 includes a clean out aperture 38 with a door 40, disposed below the level of the grate bars 28. The cleanout door 40, when closed, effectively prevents ingress of air therethrough. At its upper portion, it is provided with a combustion air opening 42, extending horizontally a portion of the wide of the clean-out door 40. A damper plate 44 is hingedly mounted at the top of the air opening 42, to the front wall of the fire box 22. The hinged position of damper plate 44 controls the amount of combustion air which can enter through air opening 42 under the fire located on grate bars 28. The position of damper plate 44 is thermostatically controlled by a thermostat 46, located inside the top corner of the stove 10, and sensing the temperature in the water jacket at the top thereof. The thermostat 46 adjusts the damper plate 44 by means of a flexible chain 48, operating on a pivoted lever 50 against which the end of the damper plate 44 abuts. The damper plate 44 is spring-urged into contact with lever 50 by means of spring 52, so that the pivoted, protruding position of the lever 50, as controlled by temperatures sensed by the thermostat 46, controls the position of damper plate 44 and hence combustion air access into fire box 22.

The bottom wall 54 of the fire box 22, below grate bars 28, is a planar plate, inclined downwardly towards the front wall 30, thereby providing a lowermost zone 56 of the fire box adjacent the front wall 30 (FIG. 2). At one side of the fire box 22, there is provided an outlet conduit 58, extending through the side wall 14 from the zone 56, and downwardly into a water trap 60. The trap 60 comprises a receptacle containing water 62, the outer end of conduit 58 terminating below the level of water 62. The outlet conduit itself has an elbow portion 64 on its outer part and a straight tubular portion 66 on its inner part, the inner end of which communicates with the lowermost zone 56 of the bottom wall 54 and can communicate liquids away from the fire box 22 into the water trap 60. A removable cover plate 68 is provided in a side wall of water trap 60, in line with straight tubular portion 66 of conduit 58. Access for cleaning and maintenance purposes can thus be gained to conduit 58, by removing the cover plate 68 from the water trap 60. An overflow pipe 70 is provided in water trap 60. With the outer end of conduit 58 disposed below the level of water 62 in the trap 60, ingress of air into the fire box 22 through conduit 58 during operation of the stove is effectively prevented.

The top wall 72 of the fire box 22 has an inclined sloping surface, sloping upwardly from the front wall 30 towards the rear wall 18, but terminating short of the rear wall 18 to define a flue outlet 74 at the rear part. There is a first flue passageway section 76 extending across the full width of the stove 10 and forwardly, inclined upwardly to the front wall 30 from the flue outlet 74. This first flue passageway section 76 is defined between a bottom wall or plate thereof 78 extending from the front wall 30, and an upper plate 80 extending from the rear wall 18. As shown in FIG. 2, the top wall 72 of the fire box 22, the upper section of the front wall 30 and the bottom plate 78 of the flue passageway 76 form a wedge-shaped section 82 between them, which is filled with water, being in communication with the water jacket 20 at both side walls 14, 16. A heat exchanger in the form of a coil 84 of copper tubing is disposed in the wedge-shaped section 82, and is sealingly secured in side wall 14 by means of its attachment plate 86. The ends 88, 90 of coil 84 protrude through attachment plate 86, for circulation of water through the coil 84, for heating of the circulating water by heat exchange with the water in the wedge-shaped section 82.

At its front, upper end the first flue passageway section 76 communicates with a second flue passageway section 92 and thence to a chimney 94 protruding upwardly through the top wall 96 of the stove. The upper wall 98 of the second flue passageway section 92 extends the full width of the stove 10 from the front wall 30, and defines another wall filled jacket with the top wall 96, for additional heat transfer from the flue passageway. At the junction location of the first and second fluid passageway sections 76, 92, the front wall 30 is apertured to provide an access aperture 100, so that the flue passageways can be reached for inspection, maintenance, etc. The access aperture 100 is closed by means of a hollow, hinged access door 102. A flexible hose 104 communicates between loading door 36 and access door 102 so that water may circulate therethrough. From access door 102, water circulates upwardly via upper hose 106 into the water jacket below the top wall 96. In this way, the doors 34 and 102 also aid in heat transfer from the furnace and constitute part of the water circulation and water heating system.

The removal of water which has circulated through the furnace jacket and become heated takes place through upwardly extending outlet pipe 108, and thence to the circulation system of the building. An expansion tank 110 with associated overflow pipe 112 is located at a level above the top of the stove 10, and is in liquid communication via supply pipe 114 with the lower part of the water jacket 20. This serves to maintain the desired level of water in the jacket 20 of the stove 10. A return tube 116 is provided, extending from the uppermost part of the water jacket to the tank 110. By means of this arrangement, the water when heated and expanded can return from the water jacket to the tank 110 if necessary, with pipe 112 taking care of any overflow. There is consequently no need for safety valves and pressure gauges to monitor the water jacket. The return tube 118 also serves the purpose of eliminating from the water in the water jacket any air bubbles, by conducting them through return tube 118 instead of allowing them to exit through outlet pipe 108. This minimizes the risk of the formation of air bubbles in the radiators, etc., of the circulatory hot water heating system, to interfere with the free water flow. A conventional temperature gauge 118 is provided, on top of the stove.

In operation, the apparatus according to the invention is efficient and readily controllable under a wide variety of operating conditions, for effective heating of water for circulation through building heating systems. Substantially all of the hot surfaces of the fire box and associated flues are used to heat transfer purposes, to water circulating therethrough. This includes the doors, the grate bars and the side walls and flue walls. Moreover, the apparatus is well suited to burn low quality fuel such as refuse, or other fuels having high moisture content, since means are provided for efficient removal of liquid condensates from the fire box, without disturbing the degree of control which can be exercised over the supply of combustion air and hence the temperature to which the water is heated. This is obtained by means of the water trap and outlet conduit as described herein. Moreover, the arrangement of upper wall of the fire box, and outlet flue, to define a wedge-shaped water filled segment is particularly advantageous, for efficiently heating water in a heat transfer coil for supply to bathrooms, sinks and the like. Because of its location and configuration, water can be heated in such an arrangement to sufficiently high temperatures for use as washing water. The provision of a water jacketed door providing access to the flue apertures makes for easy and efficient cleaning and maintenance of the apparatus as a whole.

Whilst a specific, preferred embodiment of the invention has been illustrated in detail, it will be understood that this exemplary only, and not to be construed as limiting. The scope of the invention is defined solely in the appended claims.

What I claim is:

1. A water heating stove for supply of hot water to circulating hot water heating systems, comprising:
   a fire box having a fire supporting grate therein, a fuel loading aperture in a front wall thereof and a flue outlet for exit of combustion gases therefrom;
   a water jacket lining the rear and side upright walls of said fire box;
   inlet and outlet means for circulating water into and out of said water jacket;
   a fuel loading door adapted to close the fuel loading aperture to prevent ingress of combustion air through the said aperture;
   a combustion air inlet in the fire box and disposed at a level below the fuel loading door, said combustion air inlet being equipped with damper means adapted to adjust air flow therethrough, said damper controlled air inlet comprising the sole substantial inlet for combustion air to the fire box when the fuel loading door is closed;

a bottom wall of said fire box, below the fire supporting grate, shaped to provide a lowermost zone for collection therein of liquid residues and condensates from the fire box;

an outlet conduit having an inner end communicating with said lowermost zone inside the fire box and an outer end disposed exterially of the fire box and at a level below that of the inner end;

a water trap into which the outer end of said outlet conduit protrudes, said outer end being disposed below the water level in said water trap, substantially to prevent acess of air to the fire box through said outlet conduit.

2. The stove of claim 1 wherein the damper means for said combustion air inlet is thermostatically controlled.

3. The stove of claim 2 wherein the top wall of said fire box has an inclined surface sloping upwardly from the front wall towards the rear wall to define a flue outlet adjacent the rear wall thereof, said flue outlet communicating with the forwardly extending first flue passageway section, which in turn communicates with a rearwardly extending second flue passageway section, the top wall of said fire box and the bottom wall of said first flue passageway section, together with the front wall of the fire box, defining a wedge-shaped water filled segment adapted to heat the water contained therein.

4. The stove of claim 3 including a water circulation heat exchanger in said wedge-shaped segment, for heating of water circulated through said heat exchange of a heat transfer with water in said segment.

5. The stove of claim 4 wherein said front wall of the fire box includes an inspection door opening and closing an upper aperture therein disposed at the junction of said first and second flue passageways, both of said fuel loading door and said inspection door being water jacketed and in water circulating communication with each other and with the water jacket lining the walls of the fire box.

6. The stove of claim 5 wherein the fire supporting grate comprises a plurality of tubular members extending between the side upright walls and communicating with the water jackets therein, said tubular members having slight upward inclination and providing for water circulation therethrough.

7. The stove of claim 6 wherein the bottom wall of the fire box is generally planar and inclined downwardly in the forward direction, to provide said lowermost zone adjacent the front wall of the fire box.

8. The stove of claim 7 wherein the outlet conduit has a removable elbow portion constituting the outer end thereof and a straight tubular portion constituting the inner end, the elbow portion protruding downwardly into the water trap vessel to terminate below the water level therein, said water trap being provided with an access opening in line with said straight tubular portion of the outlet conduit for maintenance thereof.

* * * * *